(12) United States Patent
Rourke et al.

(10) Patent No.: US 8,885,516 B2
(45) Date of Patent: Nov. 11, 2014

(54) SYSTEMS AND METHODS FOR EXTENDING A DETERMINISTIC FIELDBUS NETWORK OVER A WIDE AREA

(75) Inventors: Michael E. Rourke, Moscow, ID (US);
David J. Dolezilek, Pullman, WA (US);
Max B. Ryan, Moscow, ID (US); Jerry J. Bennett, Moscow, ID (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 323 days.

(21) Appl. No.: 13/267,744

(22) Filed: Oct. 6, 2011

(65) Prior Publication Data
US 2012/0087656 A1 Apr. 12, 2012

Related U.S. Application Data

(60) Provisional application No. 61/390,850, filed on Oct. 7, 2010.

(51) Int. Cl.
| | | |
|---|---|---|
| *H04L 12/28* | (2006.01) | |
| *H04L 12/46* | (2006.01) | |
| *H04L 12/40* | (2006.01) | |
| *H04J 3/16* | (2006.01) | |

(52) U.S. Cl.
CPC ...... *H04L 12/4616* (2013.01); *H04L 12/40045* (2013.01); *H04J 3/1617* (2013.01); *H04L 2012/4026* (2013.01)
USPC .......................................... 370/254; 370/402

(58) Field of Classification Search
USPC ............. 370/394, 438, 254; 324/74; 709/230, 709/219; 710/10
See application file for complete search history.

(56) References Cited

U.S. PATENT DOCUMENTS

| | | | |
|---|---|---|---|
| 5,955,859 | A | 9/1999 | Baurand |
| 6,076,952 | A | 6/2000 | Gretta |
| 6,151,640 | A | 11/2000 | Buda |
| 6,304,934 | B1 | 10/2001 | Pimenta |

(Continued)

FOREIGN PATENT DOCUMENTS

| | | |
|---|---|---|
| WO | WO2008155596 | 12/2008 |
| WO | WO2010118550 | 10/2010 |

OTHER PUBLICATIONS

Schickhuber, G., McCarthy, O.; PEI Technol., Limerick Univ.; Distributed fieldbus and control network systems, Computing & Control Engineering Journal, Feb. 1997, vol. 8 Issue 1 pp. 21-32.

(Continued)

*Primary Examiner* — Andrew Lai
*Assistant Examiner* — Jamaal Henson
(74) *Attorney, Agent, or Firm* — Richard M. Edge (57) ABSTRACT

The present disclosure provides systems and methods for extending a deterministic network over a wide geographical area. According to one embodiment, an IED may transmit data frames using a deterministic frame-based communication protocol, such as EtherCAT, via a local deterministic fieldbus. A first transceiver may encapsulate the data frames for transmission over a multiplexing synchronized optical network, such as a SONET network. A second transceiver may de-encapsulate the encapsulated data frames and transmit them via a remote deterministic fieldbus, such that communication between the local and remote deterministic fieldbuses is deterministic. Accordingly, an IED may communicate with a high level of determinism and/or in real-time with various components in a power delivery system across a wide geographical area including multiple deterministic fieldbuses.

22 Claims, 8 Drawing Sheets

(56) References Cited

U.S. PATENT DOCUMENTS

| | | | |
|---|---|---|---|
| 6,564,268 B1 | 5/2003 | Davis | |
| 6,792,337 B2 | 9/2004 | Blackett | |
| 6,853,978 B2 | 2/2005 | Forth | |
| 6,944,555 B2 | 9/2005 | Blackett | |
| 7,010,438 B2* | 3/2006 | Hancock et al. | 702/60 |
| 7,072,779 B2 | 7/2006 | Hancock et al. | |
| 7,085,824 B2 | 8/2006 | Forth | |
| 7,216,043 B2 | 5/2007 | Ransom | |
| 7,646,382 B2 | 1/2010 | Chapuis | |
| 2001/0056304 A1 | 12/2001 | Nitta | |
| 2002/0193968 A1 | 12/2002 | Gamvrelis et al. | |
| 2003/0065459 A1 | 4/2003 | Huber | |
| 2006/0052958 A1 | 3/2006 | Hancock | |
| 2006/0083260 A1 | 4/2006 | Wang | |
| 2006/0153179 A1* | 7/2006 | Ho et al. | 370/386 |
| 2006/0170409 A1* | 8/2006 | Kagan et al. | 324/74 |
| 2006/0193099 A1 | 8/2006 | Schweitzer | |
| 2006/0209886 A1 | 9/2006 | Silberman | |
| 2006/0236351 A1* | 10/2006 | Ellerbrock et al. | 725/81 |
| 2007/0140271 A1 | 6/2007 | Amante | |
| 2007/0206644 A1 | 9/2007 | Bertsch | |
| 2008/0235355 A1* | 9/2008 | Spanier et al. | 709/219 |
| 2009/0204458 A1 | 8/2009 | Wiese | |
| 2010/0057943 A1* | 3/2010 | Petricoin, Jr. | 710/10 |
| 2010/0076616 A1 | 3/2010 | Kagan | |
| 2010/0249952 A1 | 9/2010 | Snide | |
| 2010/0268850 A1 | 10/2010 | Burton | |
| 2011/0182300 A1* | 7/2011 | Chandhoke | 370/438 |

OTHER PUBLICATIONS

Burger, J., American Electri. Power Service Corp.; The utility initiative for interoperability between intelligent electronic devices in the substation—goals and status; Columbus, OH, Power Engineering Society Summer Meeting, 1999, IEEE; Issue date Jul. 18-22, 1999; vol. I pp. 28-30.

PCT/US2011/055155 Patent Cooperation Treaty, International Search Report and Written Opinion of the International Searching Authority, Jan. 23, 2012.

* cited by examiner

SYSTEMS AND METHODS FOR EXTENDING A DETERMINISTIC FIELDBUS NETWORK OVER A WIDE AREA

RELATED APPLICATIONS

This application claims the benefit of U.S. Provisional Patent Application No. 61/390,850 filed on Oct. 7, 2010, titled "Deterministic Fieldbus Network Over a Wide Area," the entirety of which is incorporated herein by reference.

TECHNICAL FIELD

This disclosure relates to deterministic fieldbus networks. Specifically, this disclosure relates to encapsulating data frames from a frame-based communication protocol for transmission over a multiplexing synchronized optical network in order to preserve determinism over a wide geographical area.

BRIEF DESCRIPTION OF THE DRAWINGS

Non-limiting and non-exhaustive embodiments of the disclosure are described, including various embodiments of the disclosure with reference to the figures, in which.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

Intelligent electronic devices (IEDs) may be used for monitoring, protecting and/or controlling industrial and utility equipment, such as in an electric power delivery system. For example, an IED, such as a programmable logic controller (PLC), protective relay, real-time automation controller (RTAC), or the like may monitor, protect, and/or control various components within an industrial or utility system, such as a power delivery system (which may include, for example, electric power generation, transmission, distribution, and/or consumption) using serial communications. Alternatively, an IED may use a frame-based communication protocol over a medium such as Ethernet to communicate with various components within such a system. Although various embodiments and description herein may refer to a power delivery system, the principles and applications described may be applied to several types of industrial or utility systems.

A frame-based communication protocol may be configured to support a deterministic fieldbus connecting various IEDs, I/O devices, gateways, and/or other components of a power delivery system. The use of Ethernet as a transmission medium may reduce the cost and improve the performance of communications between controlling IEDs and other system components.

The deterministic nature of some frame-based communication protocols, such as PROFINET, EtherNet/IP, Powerlink, and EtherCAT, may allow for real-time deterministic communications. According to some embodiments, the level of real-time response is greatly improved over traditional UDP packet-switched protocols. For example, protocols such as EtherCAT and PROFINET allow for deterministic real-time communication in the sub-millisecond range. Accordingly, various automation, control, monitoring, and/or protection systems in a power delivery system may benefit by the use of deterministic fieldbuses using frame-based communication protocols.

A fieldbus may be extended over a wide area by embedding a frame from a deterministic frame-based communication protocol within a UDP or TCP packet. The UDP or TCP packet may then be routed across a wide area network (WAN) to a remote location. For example, a power delivery system may utilize the EtherCAT protocol for communications on a local deterministic fieldbus. The power delivery system may then embed EtherCAT data frames within a TCP packet for transmission across a WAN to remote devices. However, the deterministic nature of the EtherCAT data frames is lost once the data frames are routed using TCP over the WAN. Accordingly, using standard UDP and TCP transport protocols to route frames from a deterministic fieldbus across a WAN destroys the deterministic nature of the data frames and may not be used to extend a deterministic network.

According to various embodiments of the present disclosure, a local deterministic fieldbus may be extended across a wide geographical area using a multiplexing synchronized optical network, such as a synchronous optical networking (SONET) network or a synchronous digital hierarchy (SDH) network. As described herein, the multiplexing synchronized optical network allows data frames from a local deterministic fieldbus to be communicated to a remote device or remote deterministic fieldbus while maintaining determinism. Accordingly, a local deterministic fieldbus may be connected to a remote deterministic fieldbus, such that data frames transferred between the two fieldbuses remain deterministic.

According to some embodiments, an IED may be configured to function as a PLC and moderate a local deterministic fieldbus. The IED may be configured to monitor, control, automate, and/or protect one or more I/O devices via the local deterministic fieldbus. A local transceiver, such as a small form-factor pluggable (SFP) transceiver, may be used to encapsulate data frames from the local deterministic fieldbus and transmit them via a SONET network. A remote transceiver may then de-encapsulate the data frames and transmit them via a remote deterministic fieldbus to one or more IEDs and/or I/O devices.

A power delivery system may utilize any number of SFP transceivers to interconnect a plurality of deterministic fieldbuses in order to provide for deterministic communication between various controllers and components across a wide geographical area.

The phrases "connected to" and "in communication with" refer to any form of interaction between two or more components, including mechanical, electrical, magnetic, and electromagnetic interaction. Two components may be connected to or in communication with each other, even though they may not be in direct contact with each other, and even though there may be intermediary devices between the two components.

As used herein, the term IED may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. Moreover, networking and communication devices may be incorporated in an IED or be in communication with an IED. The term IED may be used interchangeably to describe an individual IED or a system comprising multiple IEDs.

An I/O device, as described herein, may refer to an IED configured to monitor, automate, control and/or protect a particular component or set of components in a power delivery system. For example, an I/O device may comprise an IED configured to monitor a sensor, flow-meter and/or transducer; measure a current, voltage, temperature, and/or pressure; calculate a synchrophasor; and/or automate a pump and/or a valve.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special purpose processing device, such as an ASIC, PAL, PLA, PLD, Field Programmable Gate Array, or other customized or programmable device. The computer may also include a computer-readable storage device, such as non-volatile memory, static RAM, dynamic RAM, ROM, CD-ROM, disk, tape, magnetic, optical, flash memory, or other computer-readable storage medium.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. In addition, the steps of a method do not necessarily need to be executed in any specific order, or even sequentially, nor need the steps be executed only once, unless otherwise specified.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

Figure 1:
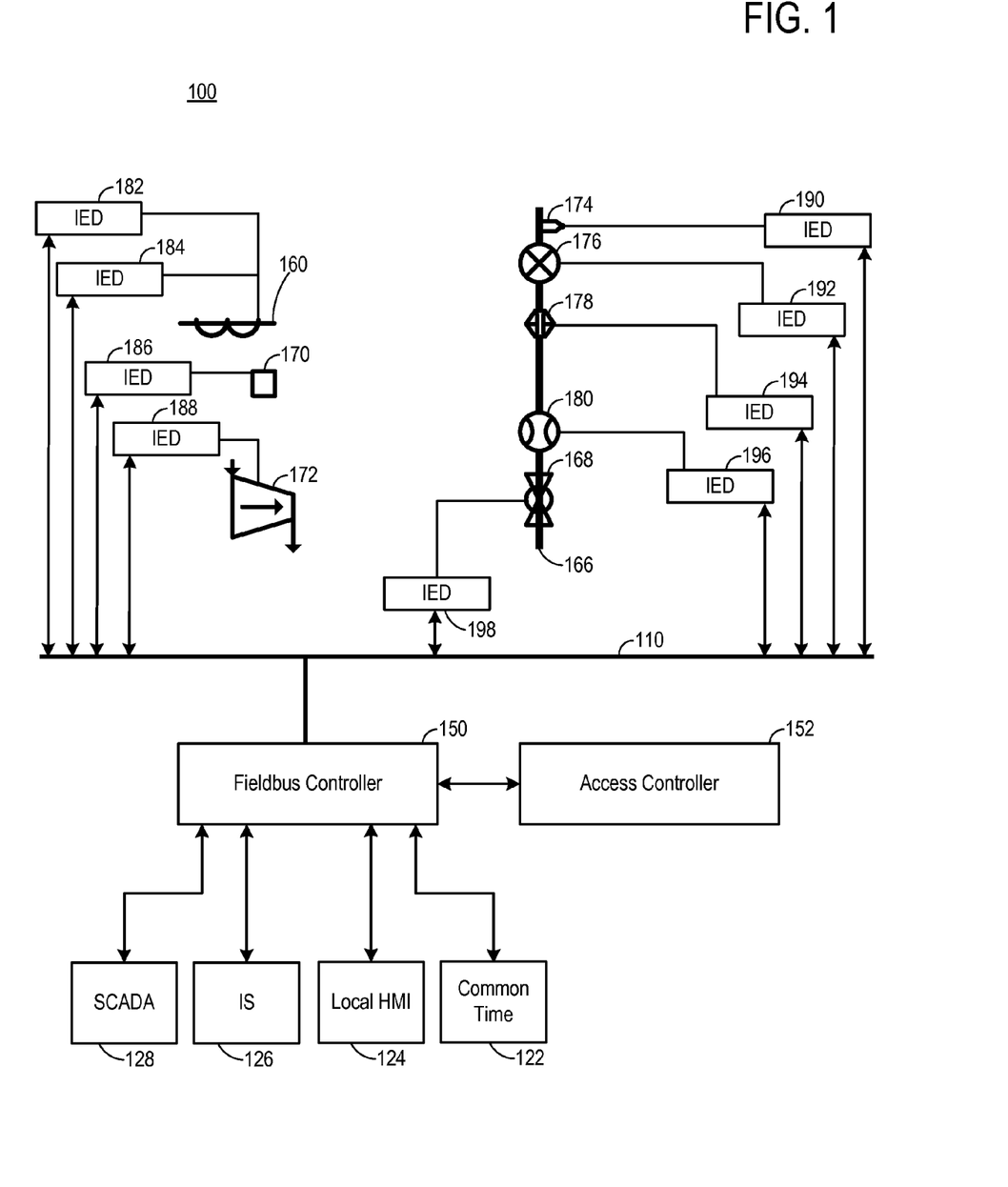
FIG. 1 illustrates an embodiment of a system including various intelligent electronic devices (IEDs) in communication with a deterministic fieldbus.

FIG. 1 illustrates an embodiment of a system 100 including various intelligent electronic devices (IEDs) 182-198 in communication with a fieldbus 110. As illustrated, IEDs 182-198 may be configured to automate, control, monitor and/or protect various system components 160-180. For example, an electric power conductor 160 may be monitored by two IEDs 182 and 184. IEDs 182 and 184 may monitor, for example, the voltage, current, impedance, reactance, phase, and/or frequency associated with electronic power conductor 160. IED 186 is shown as controlling and/or automating a breaker 170. IED 186 may monitor and/or control a pressure, temperature, shaft rotational velocity, flow rate, and/or pump status (e.g. on/off), and the like. IED 188 is illustrated as monitoring and/or controlling a compressor 172. IED 188 may receive information about conditions in the compressor from sensors in the compressor or the status of the compressor itself. Further illustrated are IEDs 190-198, each of which is in communication with a sensor or other component placed on flow system 166 through which a fluid may be flowing. Various sensors and components may be placed on flow system 166 such as valve 168, flow meter 180, IR absorption sensor 178, pressure transducer 176, and temperature transducer 174. Each sensor or equipment may be monitored by an IED 190-198. Alternatively, several of the sensors or several components may be monitored by a single IED.

IEDs 182-198 may be in communication with a fieldbus controller 150 via fieldbus 110. Fieldbus controller 150, such as a PLC, may be configured to moderate communication on fieldbus 110 between IEDs 182-198 and an access controller 152, a central monitoring system, such as SCADA system 128, and/or an information system (IS) 126. A local human-machine interface (HMI) 124 may also communicate using fieldbus 110. Local HMI 124 may be used to view data from fieldbus controller 150 and/or any of IEDs 182-198.

Common time source 122 may provide a common time to fieldbus controller 150 and/or to connected IEDs 182-198. Common time source 122 may be used by fieldbus controller 150 for time stamping information and data. Time synchronization may be helpful for data organization, real-time decision-making, as well as post-event analysis. Time synchronization may further be applied to network communications. Common time source 122 may be any time source that is an acceptable form of time synchronization. For example, common time source 122 may be available from GPS satellites and follow the IRIG-B protocol, may be provided over the WWB or WWVB radio networks, or may be kept locally by fieldbus controller 150. Time may be synchronized throughout the system using a SCADA protocol (such as DNP 3.0 or IEC 61850), or using network time synchronization (such as Network Time Protocol or Simple Network Time Protocol). In the absence of a discrete common time source, fieldbus controller 150 may serve as the time source by distributing a time synchronization signal (received from one of the sources described).

As illustrated in FIG. 1, communication between SCADA system 128, information system 126, and IEDs 182-198 may be routed through fieldbus controller 150. Fieldbus controller 150 may be configured to moderate fieldbus 110 as a deterministic fieldbus. According to various embodiments, fieldbus 110 may comprise an industrial Ethernet fieldbus utilizing a deterministic frame-based protocol, such as EtherCAT or PROFINET. System 100 may utilize a deterministic fieldbus 110 in order to provide reliable and predictable real-time monitoring, control, automation, and/or protection of system components 160-180. According to various embodiments, the deterministic nature of fieldbus 110 is preserved by omitting non-deterministic routers, hubs, and switches from the system.

Figure 2:
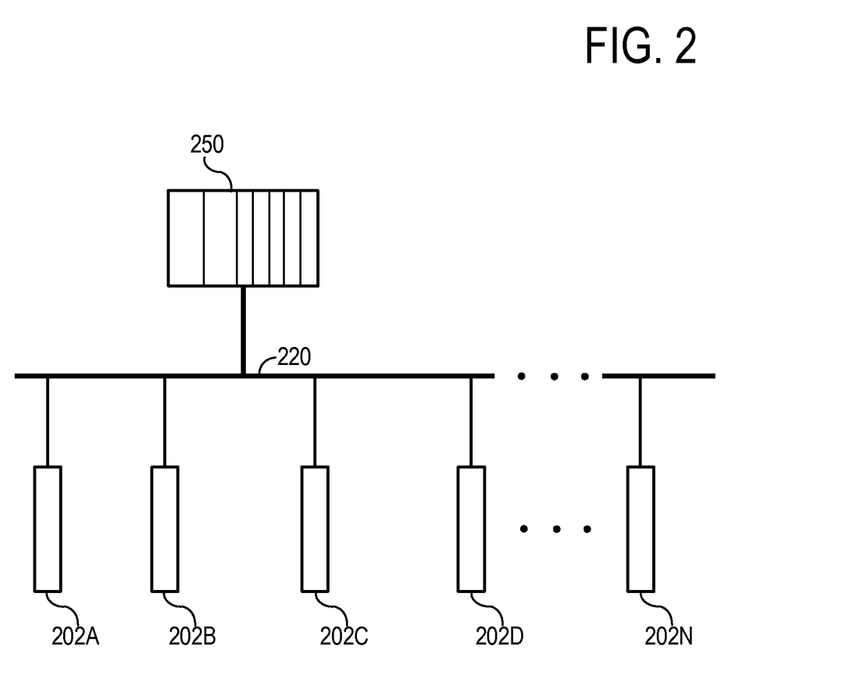
FIG. 2 is a block diagram of a an IED functioning as a programmable logic controller (PLC) in communication with various input/output (I/O) devices via a deterministic fieldbus.

FIG. 2 is a block diagram of an IED 250 functioning as a PLC in communication with various input/output (I/O) devices 202A-202N via a fieldbus 220. Fieldbus 220 may utilize an Ethernet bus or serial connections between each of I/O devices 202A-202N and IED 250. Fieldbus 220 may comprise an Ethernet fieldbus that is non-deterministic. Utilizing conventional Ethernet protocols, data frames transmitted by IED 250 may be routed and/or switched at various locations along fieldbus 220 until they reach an intended I/O device. For example, a standard UDP or TCP/IP protocol may facilitate communications in a non-deterministic manner between IED 250 and I/O devices 202A-202N.

Alternatively, IED 250 may be in communication with I/O devices 202A-202N via a deterministic fieldbus 220 utilizing a deterministic frame-based communication protocol, such as EtherCAT or PROFINET. The deterministic nature of fieldbus 220 may be preserved by omitting non-deterministic routers, hubs, and/or switches from fieldbus 220. According to some embodiments, gateways and junctions may be utilized along fieldbus 220 that are configured to preserve determinism.

Figure 3:
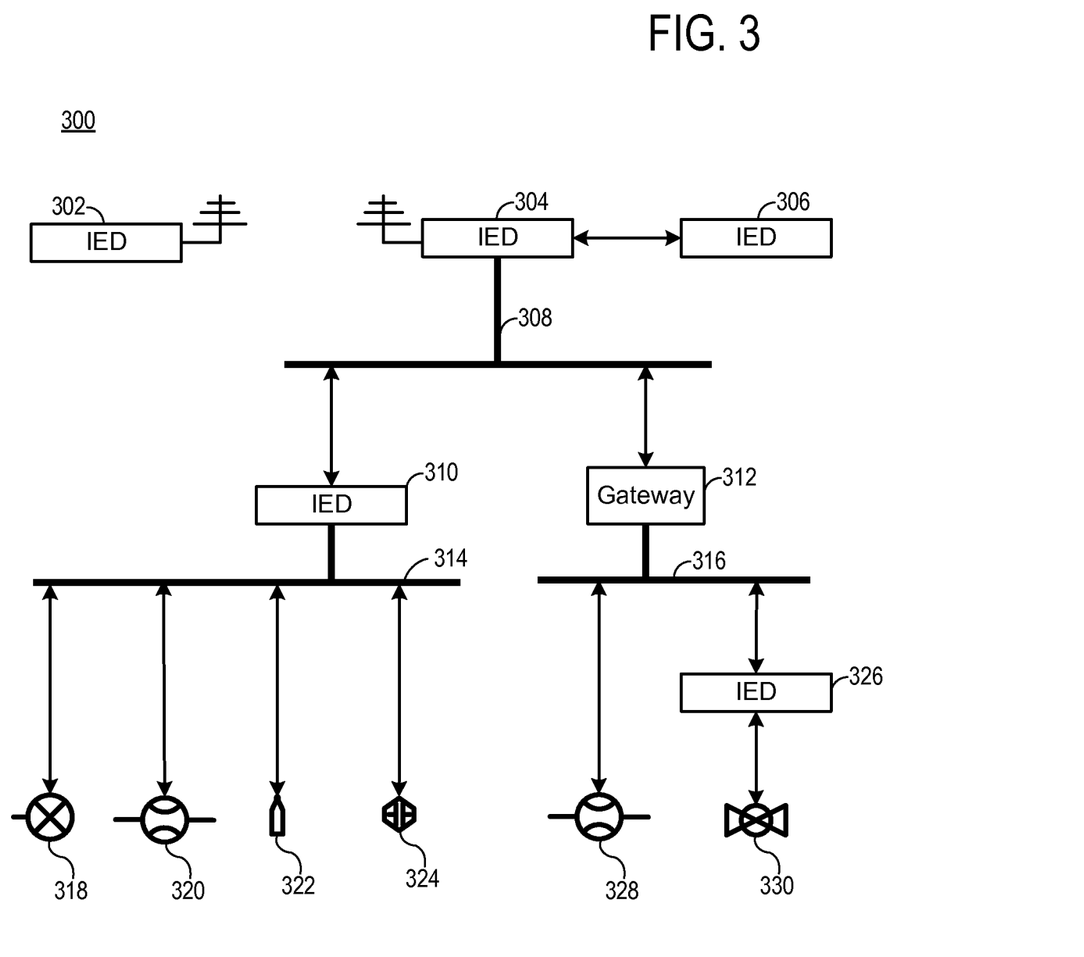
FIG. 3 illustrates an embodiment of a hierarchical deterministic fieldbus, including a plurality of IEDs, a gateway, and various I/O devices.

FIG. 3 illustrates an embodiment of a system 300, including a plurality of interconnected fieldbuses 308, 314, and 316. As illustrated, IEDs 302, 304, and 306 may be in communication with one another. IED 302 may be in communication with IED 304 via a wireless radio link. IED 306 may be in direct communication with IED 304. As illustrated, IED 304 may be configured to moderate a first fieldbus 308. IED 310, gateway 312, and any number of I/O devices may be in communication with IED 304 via first fieldbus 308.

IED 304 may be configured to function as a PLC for first fieldbus 308. Accordingly, IED 304 may moderate communications between IEDs 302 and 306 and system components connected to first fieldbus 308. IED 310 may be configured to moderate a second fieldbus 314. I/O devices 318, 320, 322, and 324 may be in communication with IED 310 via second fieldbus 314. Accordingly, I/O devices 318, 320, 322, and 324 may communicate with IED 304 via second fieldbus 314 and first fieldbus 308. Gateway 312 may be configured to bridge a third fieldbus 316 with first fieldbus 308. I/O devices 328 and 330 may communicate with IED 304 via third fieldbus 316, gateway 312, and first fieldbus 308. Some I/O devices may directly communicate with a fieldbus, as illustrated by I/O devices 318-324 and I/O device 328. Other I/O devices may utilize an intermediary IED to communicate with a fieldbus, as illustrated by I/O device 330 and IED 326.

As illustrated, a plurality of fieldbuses 308, 314, and 316 may be interconnected via a gateway 312, an IED 310, and/or through direct line connections. According to some embodiments, fieldbuses 308, 314, and 316 may be configured as non-deterministic fieldbuses. For example, each of fieldbuses 308, 314, and 316 may include standard routers, hubs, and switches and utilize a traditional UDP or TCP/IP protocol. According to other embodiments, each individual fieldbus 308, 314, and 316 may be a deterministic fieldbus, but the interconnections of the various fieldbuses 308, 314, and 316 may not be deterministic. For example, while first fieldbus 308 may be deterministic and third fieldbus 316 may be deterministic, the connecting gateway 312 may not provide a deterministic connection. In such embodiments, communication between IED 304 and I/O devices 328 and 330 would not be deterministic.

According to still further embodiments, each fieldbus 308, 314, and 316 may be deterministic and the interconnections of the various fieldbuses 308, 314, and 316 may be configured to preserve determinism. In such embodiments, IEDs 302, 304, and 306 may be capable of communicating with I/O devices 318-324, 328, and 330 in a deterministic manner. Some types of automation, control, monitoring, and/or protection systems may substantially benefit or even require deterministic communications between an IED and an I/O device.

Figure 4A:
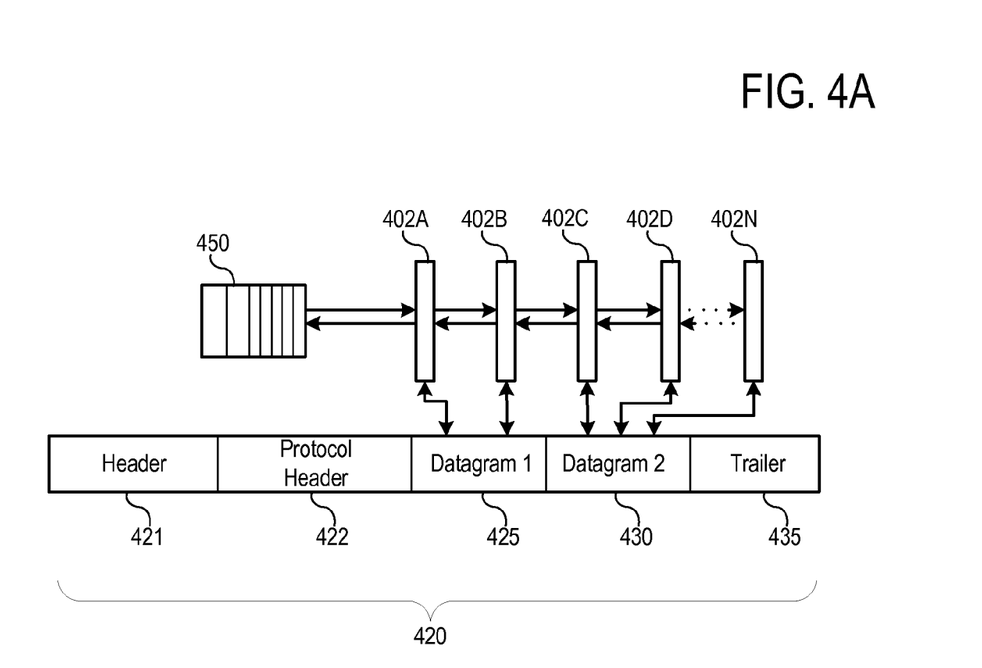
FIG. 4A illustrates a block diagram of a frame from a frame-based protocol including two datagrams transmitted via a deterministic fieldbus to a plurality of I/O devices.

FIG. 4A illustrates a block diagram of a frame 420 from a frame-based protocol, including two datagrams 425 and 430 transmitted via a deterministic fieldbus to a plurality of I/O devices 402A-402N. As illustrated, a deterministic fieldbus may utilize a unique Ethertype whereby data in the network may be contained within one or more shared frames, rather than a unique frame for each connected device. For example, each of I/O devices 402A-402N may be configured to communicate with IED 450 using a single shared frame 420. Communication between IED 450 and I/O devices 402A-402N may utilize multiple shared frames depending on the amount of data being transferred. IED 450 may be configured to function as a PLC moderating data transported via the deterministic fieldbus between I/O devices 402A-402N, IED 450, and external communication components.

According to various embodiments, IED 450 and I/O devices 402A-402N may be in communication via a deterministic Ethernet fieldbus and configured to utilize a deterministic frame-based communication Protocol. For example, IED 450 and I/O devices 402A-402N may communicate using PROFINET or EtherCAT over an Ethernet bus, for example. As illustrated, frame 420 may include a header 421, a protocol header 422, a first datagram 425, a second datagram 430, and a trailer 435. First and second datagrams 425 and 430 may contain data transferred between any of I/O devices 402A-402N and IED 450. Trailer 435 may include a checksum, CRC, or similar verification information. Accordingly, rather than each of I/O devices 402A-402N transmitting its own frame, IED 450 may transmit frame 420 to all of I/O devices 402A-402N. Each of I/O devices 402A-402N may then read the datagram or portion of a datagram that pertains to it. Each of I/O devices 402A-402N may also insert data into the datagram or portion of a datagram that pertains to it. Accordingly, multiple devices connected to a deterministic fieldbus may communicate using one or more shared data frames from a frame-based communication protocol.

Figure 4B:
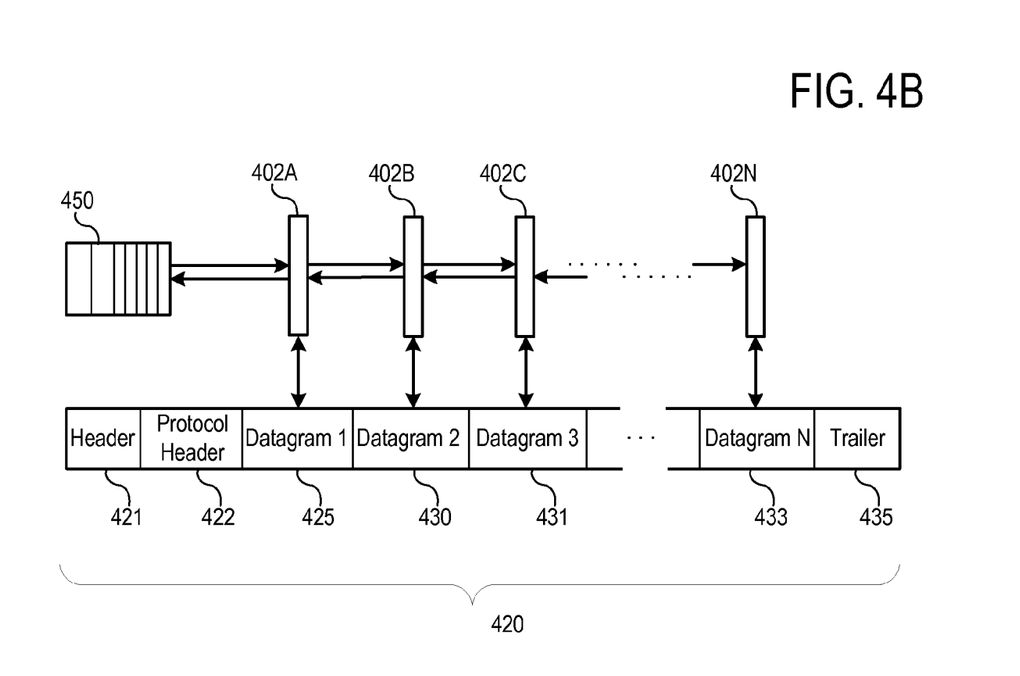
FIG. 4B illustrates a block diagram of a frame from a frame-based protocol including a plurality of datagrams transmitted via a deterministic fieldbus to a corresponding plurality of I/O devices.

According to various embodiments, any number of datagrams may be used, and the ratio of datagrams to I/O devices may be modified as suitable for a particular application, as will be appreciated by one having skill in the art. FIG. 4B illustrates an embodiment in which each of I/O devices 402A-402N is configured to read and insert data to a corresponding datagram 425-433. As illustrated, there may be a one to one correspondence between the number of datagrams 425-433 and the number of I/O devices 402A-402N.

The deterministic fieldbus illustrated in FIGS. 4A and 4B may deterministically connect IED 450 and each of I/O devices 402A-402N, allowing each of I/O devices 402A-402N to operate on the same subnet. However, if the deterministic fieldbus is extended beyond the subnet using routers, hubs, and/or switches, then randomness may be introduced making the system non-deterministic. Such non-deterministic networks may not be suitable for certain monitoring, controlling, protecting, or automating systems.

Figure 5:
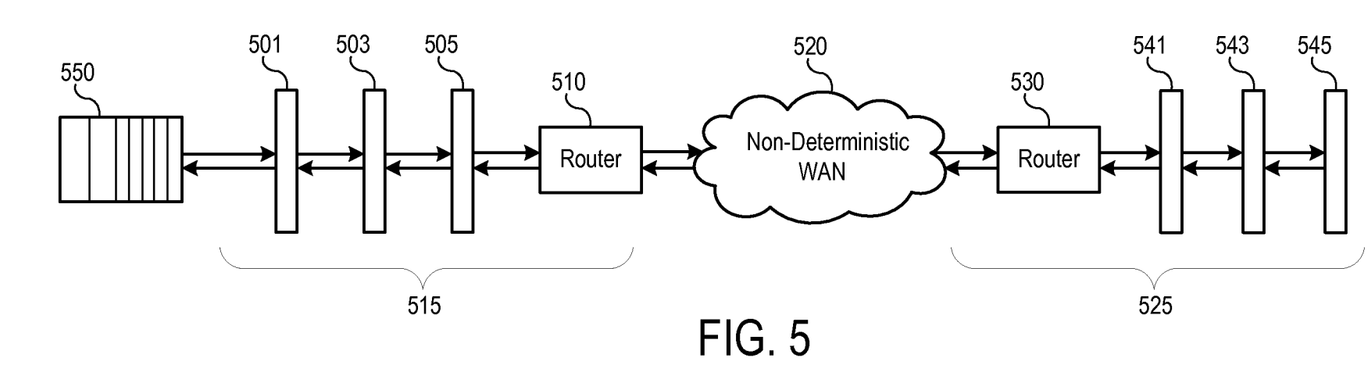
FIG. 5 illustrates an IED configured to communicate with various components in a power delivery system using a non-deterministic wide-area network (WAN) to connect a local network to a remote network.

FIG. 5 illustrates an IED 550 configured to communicate with various I/O devices 501-505 and 541-545 in a power delivery system using a non-deterministic wide-area network (WAN) 520 to connect a local network 515 to a remote network 525. As illustrated, IED 550 may be configured to function as a PLC and moderate local network 515 and remote network 525. According to various embodiments, local network 515 may be a deterministic network configured to utilize a frame-based communication protocol. For example, local network 515 may comprise an Ethernet fieldbus and utilize EtherCAT or PROFINET.

As illustrated, local network 515 may be routed by router 510 over non-deterministic WAN 520 to router 530. Router 510 may be configured to embed data frames from a deterministic frame-based protocol within TCP packets in order to correctly route them through non-deterministic WAN 520. Router 530 may then route the data frames to the correct location within remote network 525. According to some embodiments, remote network 525 may be a deterministic fieldbus network utilizing a deterministic frame-based communication protocol. Accordingly, communications between any of I/O devices 541, 543, and 545 may be deterministic.

Even if each of local network 515 and remote network 525 are deterministic, communications between IED 550 and I/O devices 541-545 cannot be deterministic since local network 515 and remote network 525 are connected via non-deterministic WAN 520. As previously described, some types of automation, control, monitoring, and/or protection systems may substantially benefit or even require deterministic communications between an IED and an I/O device. Accordingly, while IED 550 may be able to communicate with I/O devices 541-545, the lack of determinism may prevent real-time automation, control, monitoring and/or protection over a wide geographical area.

Figure 6:
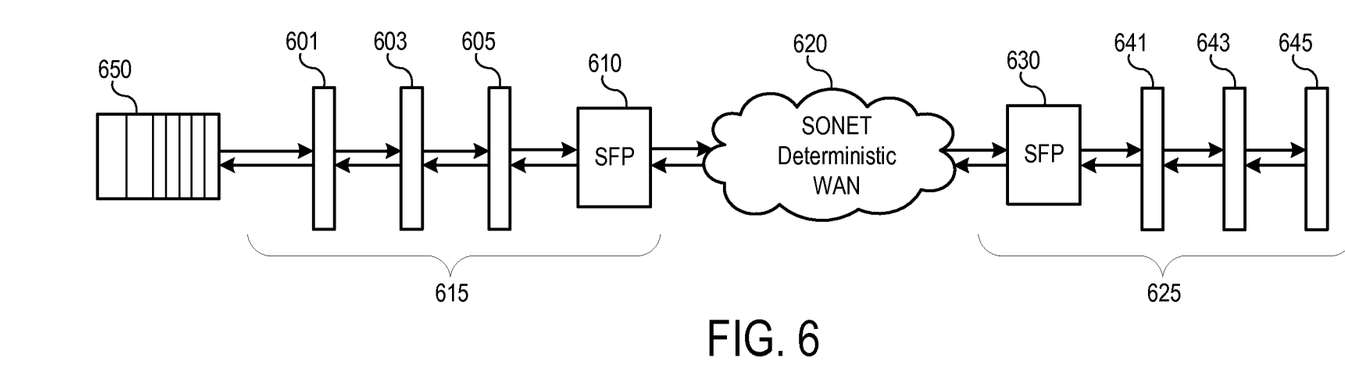
FIG. 6 illustrates an IED configured to monitor, control, and/or protect various components in a power delivery system using a multiplexing synchronized optical network to deterministically connect a local deterministic fieldbus to a remote deterministic fieldbus.

FIG. 6 illustrates an IED 650 configured to monitor, control, and/or protect a system using various I/O devices 601-605 and 641-645 in a power delivery system using a multiplexing synchronized optical network (e.g., SONET WAN 620) to connect a local deterministic fieldbus 615 to a remote deterministic fieldbus 625. SONET WAN 620 may preserve the determinism of communications between local deterministic fieldbus 615 and remote deterministic fieldbus 625. According to various embodiments, remote deterministic fieldbus 625 may be configured to operate on the same subnet as local deterministic fieldbus 615.

According to various embodiments, small form-factor pluggable (SFP) transceiver 610 receives data frames transported via local deterministic fieldbus. SFP transceiver 610 may then encapsulate the received data frames for transport over SONET WAN 620. SFP transceiver 630 may receive the encapsulated data frames, de-encapsulate them, and transmit them via remote deterministic fieldbus 625. Accordingly, IED 650 may communicate in a deterministic manner with I/O devices 641-645, allowing IED 650 to automate, control, monitor, and/or protect I/O devices 641-645 by transmitting deterministic data frames.

SFP transceivers 610 and 630 may be incorporated as modules into a network communication device such as, for example, a communication multiplexer or Ethernet switch. SFP transceivers 610 and 630 may be incorporated as modules into different network communication devices which are in communication over a network such as a SONET Deterministic WAN 620. As described herein, a local SFP transceiver 610 may be configured to receive frames of data from local deterministic network 615, encapsulate them, and pass the encapsulated frames to the network communication device for communication across the WAN (such as WAN 620), where the receiving network communication device may receive the encapsulated data and pass such to SFP 630 for de-encapsulating and transmission to its respective remote deterministic network 625.

For example, IED 650, which may function as a PLC, may transmit one or more frames of power system data using a deterministic frame-based communication protocol over an Ethernet fieldbus (e.g., local deterministic fieldbus 615). I/O devices 601-605 may receive one or more of the frames of power system data and/or transmit additional frames of power system data. SFP transceiver 610 may then receive the frames of power system data, encapsulate them, and then transmit the encapsulated frames of power system data via SONET WAN 620 to SFP transceiver 630. SFP transceiver 630 may then de-encapsulate the encapsulated frames of power system data and transmit them over remote deterministic network 625 using the deterministic frame-based communication protocol. Similarly, I/O devices 641-645 may transmit data frames to I/O devices 601-605 and IED 650 by transmitting data frames through SFP transceiver 630, SONET WAN 620, and SFP transceiver 610.

Accordingly, a local deterministic fieldbus may be extended over a wide area (i.e., connected to a remote deterministic fieldbus) by encapsulating data frames from one deterministic fieldbus and transmitting them using a SONET WAN (or alternatively an SDH WAN) to another deterministic fieldbus. The resulting extended network provides for deterministic communications between system components connected to either the local or the remote deterministic fieldbuses. In contrast, attempting to embed data frames from one deterministic fieldbus within UDP or TCP packets and routing them across a traditional WAN results in a permanent loss of determinism (as discussed in conjunction with FIG. 5).

Figure 7:
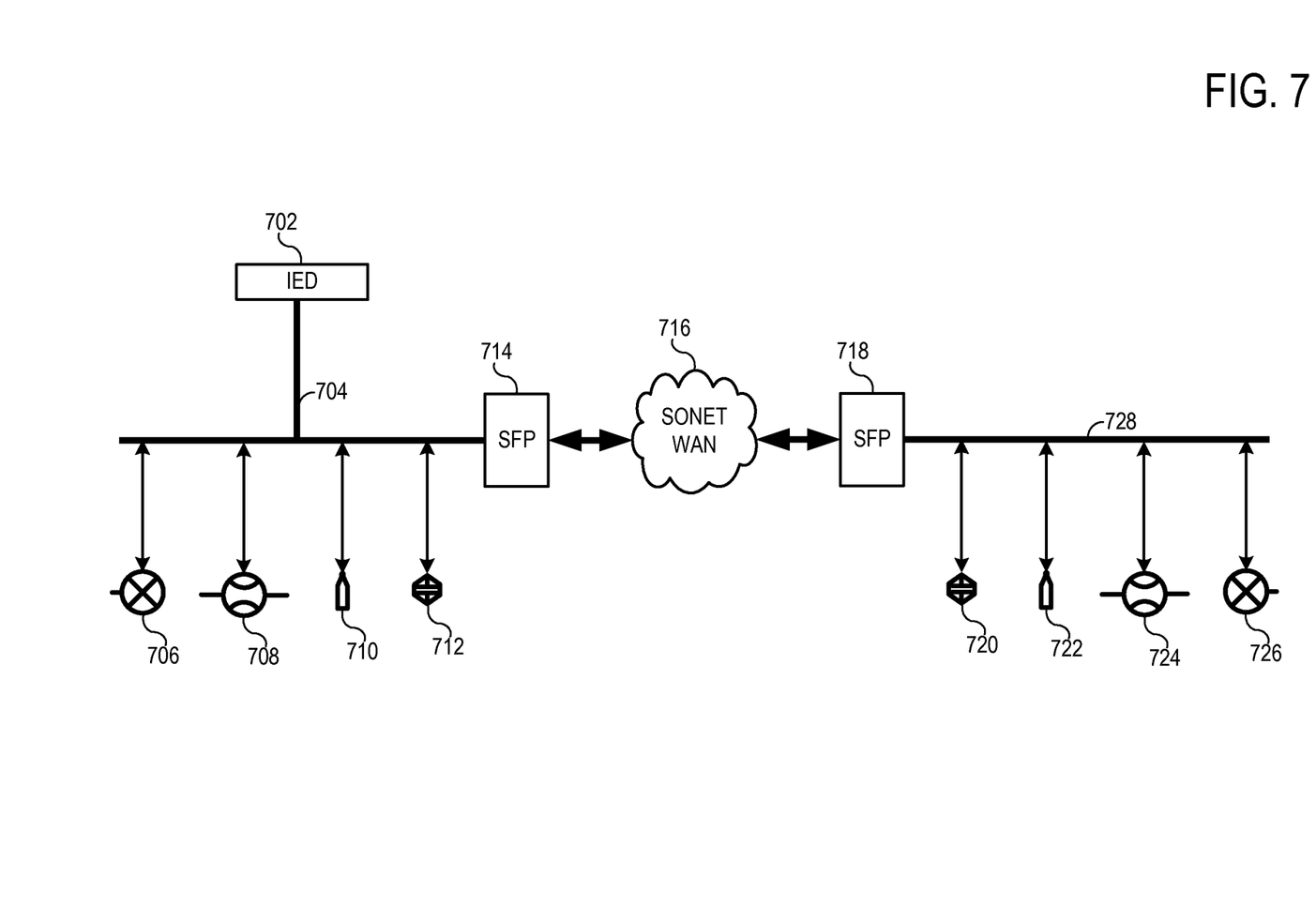
FIG. 7 illustrates an embodiment of a multiplexing synchronized optical network used to interconnect a local deterministic fieldbus and a remote deterministic fieldbus.

FIG. 7 illustrates an embodiment of a multiplexing synchronized optical network (e.g., SONET WAN 716) configured to interconnect a local deterministic fieldbus 704 and a remote deterministic fieldbus 728, thereby extending local deterministic fieldbus 704. As illustrated, an IED 702 may be in communication with I/O devices 706-712. IED 702 may moderate communications between outside devices and/or between I/O devices 706-712. According to various embodiments, communication via local deterministic fieldbus 704 may utilize a deterministic frame-based communication protocol, such as PROFINET or EtherCAT. SFP transceiver 714 may be configured to encapsulate data frames transmitted on local deterministic fieldbus 704 and transmit the encapsulated data frames via SONET WAN 716 to SFP transceiver 718. SFP transceiver 714 may also be configured to de-encapsulate encapsulated data frames transmitted by SFP 718 via SONET WAN 716. Encapsulated data frames may be de-encapsulated by SFP transceivers 714 and 718 and then transmitted over their respective deterministic fieldbuses 704 and 728. I/O devices 720-726 may be in communication with one another via remote deterministic fieldbus 728 using a deterministic frame-based communication protocol. According to some embodiments, remote deterministic fieldbus 728 may be configured to operate on the same subnet as local deterministic fieldbus 704. Alternatively, remote deterministic fieldbus 728 and local deterministic fieldbus 704 may operate on different subnets and SFP transceivers 714 and 718 may facilitate any necessary translation.

Figure 8:
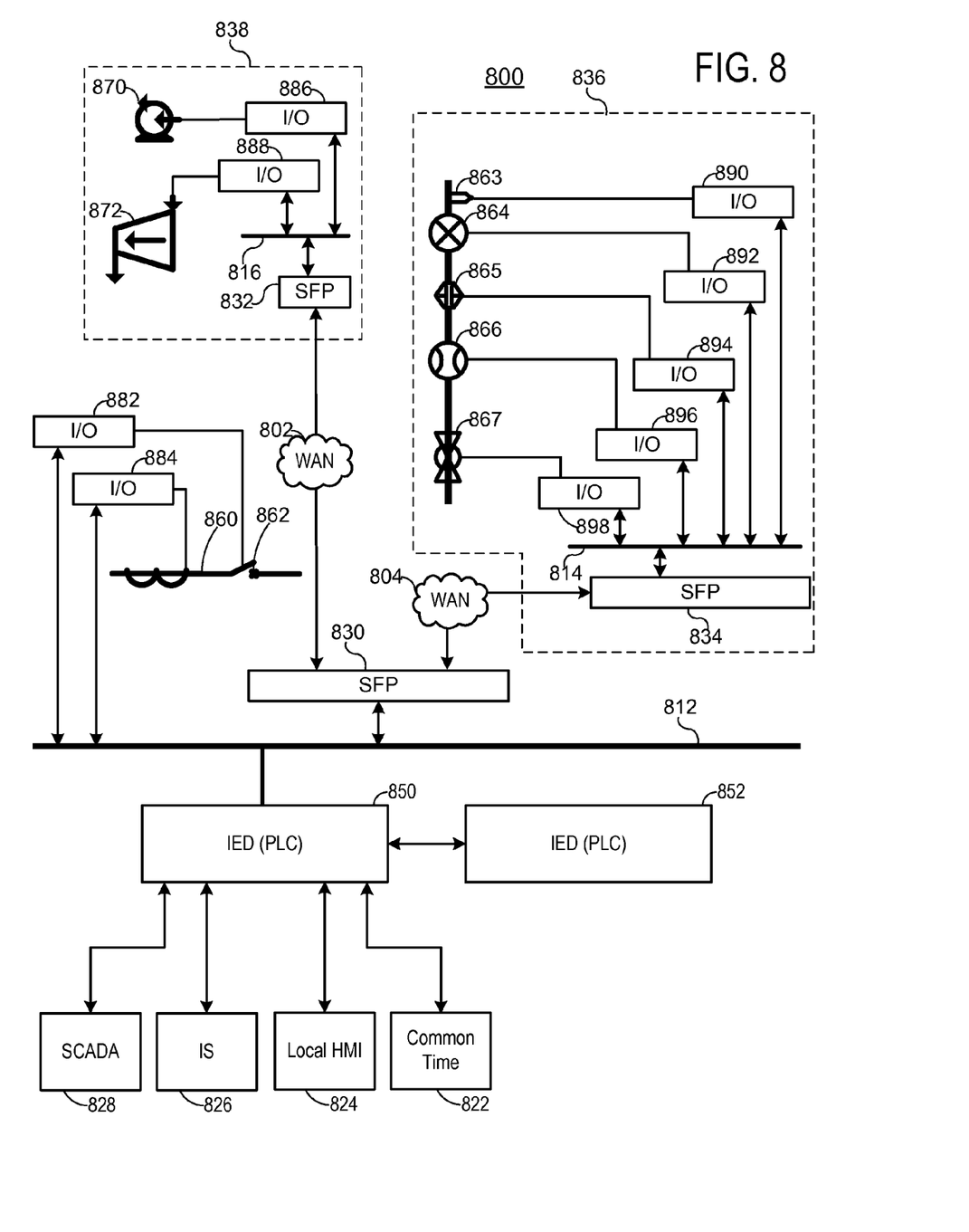
FIG. 8 illustrates an embodiment of a system for automating, controlling, monitoring, and/or protecting various components in a utility or industrial system using deterministic communications across a wide area network (WAN).

As illustrated in FIG. 8, any number of deterministic fieldbuses (e.g., 812, 814, and 816) may be interconnected in a deterministic manner using SFP transceivers (e.g., 830, 832, and 834) configured to encapsulate data frames from a deterministic frame-based communication protocol and transport them over a multiplexing synchronized optical network, such as SONET and SDH networks (e.g., WAN 802 and 804). As illustrated, system 800 provides for deterministic communication over a wide geographical area. In particular, system 800 may facilitate real-time and/or deterministic control, automation, monitoring, and/or protection of various components in an industrial or utility system such as an electrical power delivery system. For example, conductor 860 and breaker 862 may be monitored and controlled using I/O devices 882 and 884. I/O devices 882 and 884 may communicate directly with a fieldbus 812, or alternatively they may communicate with an intermediary IED (not shown) configured to communicate with deterministic fieldbus 812. Deterministic fieldbus 812 may be an Ethernet fieldbus configured to transport data using a deterministic frame-based communication protocol.

Within remote substation 838, pump 870 may be monitored and/or controlled by I/O device 886 and compressor 872 may be monitored and/or controlled by I/O device 888. I/O devices 886 and 888 may be in communication with deterministic fieldbus 816. Similarly, remote substation 836 may include I/O devices 890-898 configured to automate, control, monitor, and/or protect system components 863-867, respectively. I/O devices 890-898 may be in communication with deterministic fieldbus 814. Deterministic fieldbuses 814 and 816 may each comprise an Ethernet fieldbus configured to transport data using a deterministic frame-based communication protocol. Further, deterministic fieldbuses 814 and 816 may each be in deterministic communication with deterministic fieldbus 812 via SFP transceivers 830, 832, and 834 and WANs 802 and 804. According to various embodiments, WANs 802 and 804 may comprise multiplexing synchronized optical networks configured to preserve determinism.

For example, SFP transceiver 832 may encapsulate data frames transported on deterministic fieldbus 816 and transmit them over a SONET WAN, such as WAN 802, to SFP transceiver 830. SFP transceiver 830 may then de-encapsulate the encapsulated data frames and transmit them via deterministic fieldbus 812. Likewise, SFP transceiver 834 may encapsulate data frames transported on deterministic fieldbus 814 and transmit them over a SONET WAN, such as WAN 804, to SFP transceiver 830. SFP transceiver 830 may then de-encapsulate the encapsulated data frames and transmit them via deterministic fieldbus 812. SFP transceiver 830 may also transmit encapsulated frames from deterministic fieldbus 812 and transmit them to one or both of SFP transceivers 832 and 834 for de-encapsulation and retransmission via deterministic fieldbuses 814 and 816.

IED 850 may be configured to monitor, control, automate, and/or protect one or more of I/O devices 882-898. IED 850 may further be in communication with an IS 826, a local HMI 824, and/or receive a common time reference 822. IED 850 may moderate and/or facilitate access to deterministic fieldbus 812 for another control IED 852 or SCADA 828 to monitor, control, automate, and/or protect one or more of I/O devices 882-898. According to some embodiments, IED 850 may be configured to transmit a single data frame including a plurality of datagrams (as discussed in conjunction with FIGS. 4A-4B) that may be read by each of I/O devices 882-898. Accordingly, each of I/O devices 882-898 may be configured to read and write to the datagram belonging to it. IED 850 may be configured to utilize any of a wide variety of deterministic frame-based communication protocols, including PROFINET and EtherCAT. IED 850 may perform monitoring, controlling, automation, and/or protection functions of I/O devices 882-898 and other system components 863-867 within substations 836 and 838 in a deterministic manner as if they were directly connected to deterministic fieldbus 812, since deterministic fieldbuses 814 and 816 are connected to deterministic fieldbus 812 via multiplexing synchronized optical network WANs 802 and 804.

Figure 9:
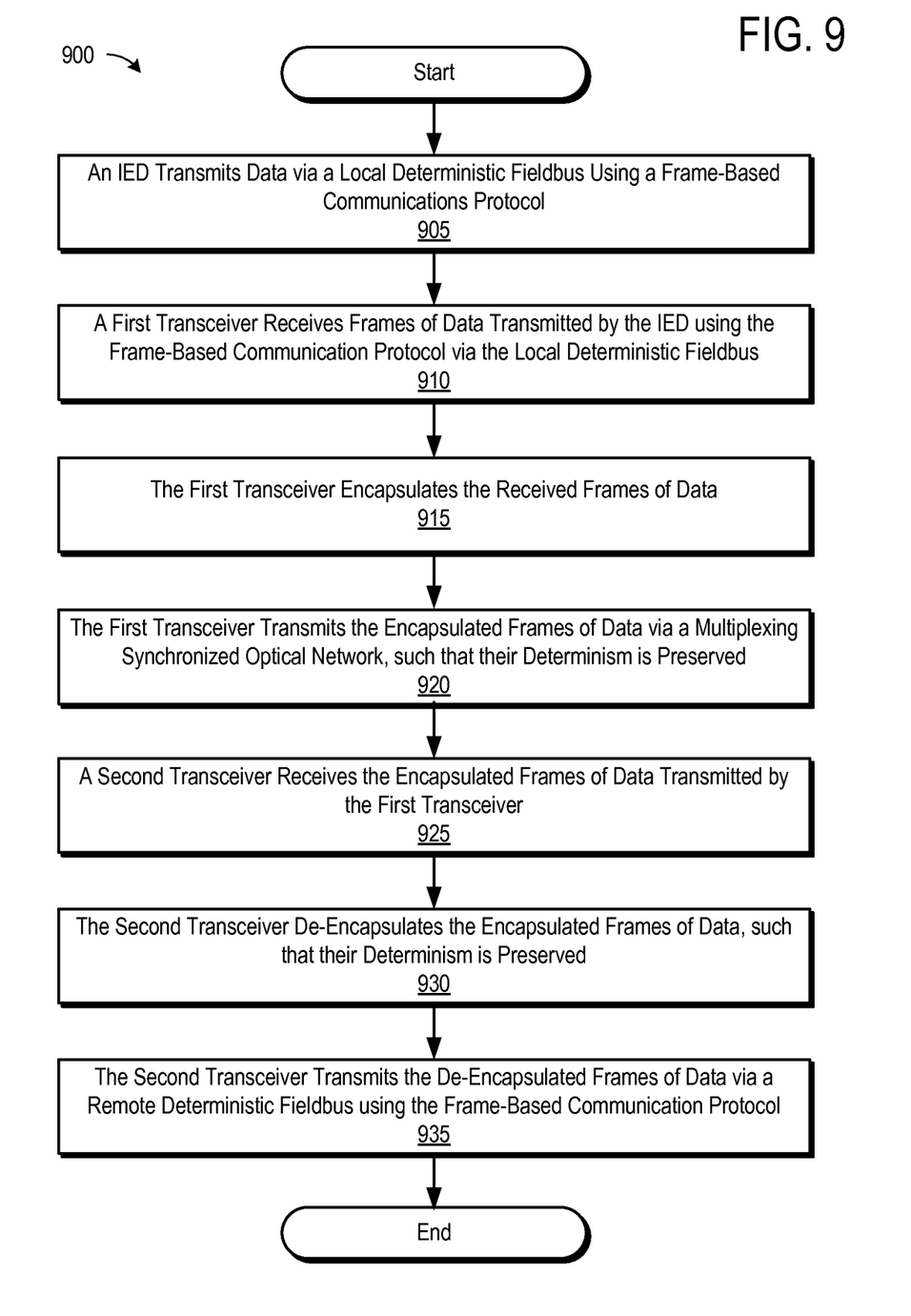
FIG. 9 provides a flowchart of a method for extending a deterministic fieldbus over a wide area using a multiplexing synchronized optical network.

FIG. 9 provides a flowchart of a method 900 for extending a deterministic fieldbus over a wide area using a multiplexing synchronized optical network. An IED may transmit data via a local deterministic fieldbus using a frame-based communications protocol, at 905. For example, an IED may utilize EtherCAT or PROFINET to transmit data via a deterministic Ethernet fieldbus in order to control, automate, monitor, and/or protect various components of a power delivery system. A first transceiver may receive frames of data transmitted by the IED using the frame-based communication protocol via the local deterministic fieldbus, at 910. The first transceiver may encapsulate one or more received frames of data, at 915. The first transceiver may then transmit the encapsulated frames of data via a multiplexing synchronized optical network, such that their determinism is preserved, at 920.

For example, a transceiver may be configured to encapsulate one or more frames of data transmitted by an IED using the EtherCAT protocol and then transmit them over a SONET WAN. The transceiver and the SONET WAN may be specifically configured to preserve the deterministic nature of communications transmitted on the local fieldbus. In contrast, traditional routers and non-deterministic WANs, such as those using UDP and TCP/IP, may not preserve the determinism of data frames transmitted via the local fieldbus.

Encapsulated frames of data transmitted via the multiplexing synchronized optical network may be received by a second transceiver, at 925. The second transceiver may then de-encapsulate the encapsulated frames of data, such that their determinism is preserved, at 930. The second transceiver may then transmit the de-encapsulated frames data via a remote deterministic fieldbus using the frame-based communication protocol, at 935. Accordingly, frames of data transmitted by the IED via the local deterministic fieldbus may be encapsulated and transmitted via multiplexing synchronized optical networks, allowing deterministic communications over a wide geographical area.

The above description provides numerous specific details for a thorough understanding of the embodiments described herein. However, those of skill in the art will recognize that one or more of the specific details may be omitted, modified, and/or replaced by a similar process or system.

What is claimed:

1. A method for extending a deterministic network configured to transport power system data, comprising:
   an intelligent electronic device (IED) transmitting power system data via a local deterministic network bus using a deterministic frame-based communication protocol;
   a first transceiver receiving frames of power system data transmitted by the IED using the deterministic frame-based communication protocol via the local deterministic network bus;
   the first transceiver encapsulating the received frames of power system data; and
   the first transceiver transmitting the encapsulated frames of power system data via a multiplexing synchronized optical network to a remote deterministic network bus, such that a determinism of the frames of power system data is preserved over the multiplexing synchronized optical network to the remote deterministic network bus.

2. The method of claim 1, further comprising:
   a second transceiver receiving the encapsulated frames of power system data transmitted by the first transceiver via the multiplexing synchronized optical network;
   the second transceiver de-encapsulating the received encapsulated frames of power system data; and
   the second transceiver transmitting the de-encapsulated frames of power system data via the remote deterministic network bus using the deterministic frame-based communication protocol, such that the determinism of the frames of power system data is preserved.

3. The method of claim 2, wherein the local deterministic network bus is configured to operate on a subnet and the remote deterministic network bus is configured to operate on the same subnet.

4. The method of claim 2, further comprising the IED communicating power system data with a remote input/output (I/O) device connected to the remote deterministic bus via the first transceiver and the second transceiver.

5. The method of claim 1, further comprising a local input/output (I/O) device communicating power system data with the IED via the local deterministic network bus.

6. The method of claim 1, wherein the local deterministic network bus comprises a deterministic Ethernet fieldbus.

7. The method of claim 1, wherein the deterministic frame-based communication protocol comprises one of EtherCAT and PROFINET.

8. The method of claim 1, wherein the multiplexing synchronized optical network comprises one of a synchronous optical networking (SONET) network and a synchronous digital hierarchy (SDH) network.

9. The method of claim 1, wherein the first transceiver comprises a small form-factor pluggable (SFP) transceiver.

10. A system for extending a deterministic network in a power delivery system over a wide area, comprising:
    a local deterministic network bus configured to transport power system data using a deterministic frame-based communication protocol;
    an intelligent electronic device (IED) configured to transmit power system data via the local deterministic network bus using the deterministic frame-based communication protocol;
    a first transceiver in communication with the local deterministic network bus, the first transceiver configured to:
    receive frames of power system data transmitted by the IED using the deterministic frame-based communication protocol;
    encapsulate the received frames of power system data; and
    transmit the encapsulated frames of power system data via a multiplexing synchronized optical network to a remote deterministic network bus; and
    wherein a determinism of the encapsulated frames of power system data is configured to be preserved during the transmission of the encapsulated frames of power system data via the multiplexing synchronized optical network from the local deterministic network bus to the remote deterministic network bus.

11. The system of claim 10, further comprising:
    the remote deterministic network bus configured to transport power system data using the deterministic frame-based communication protocol; and
    a second transceiver in communication with the remote deterministic network bus configured to:
    receive encapsulated frames of power system data transmitted by the first transceiver via the multiplexing synchronized optical network;
    de-encapsulate the received encapsulated frames of power system data; and
    transmit the de-encapsulated frames of power system data via the remote deterministic network bus using the deterministic frame-based communication protocol; and
    wherein determinism of the de-encapsulated frames of power system data is configured to be preserved during the transmission of the de-encapsulated frames of power system data over the remote deterministic network.

12. The system of claim 11, further comprising at least one remote input/output (I/O) device in communication with the remote deterministic bus configured to communicate power system data with the IED via the first transceiver and the second transceiver.

13. The system of claim 10, further comprising at least one local input/output (I/O) device configured to communicate power system data with the IED via the local deterministic network bus.

14. The system of claim 10, wherein the local deterministic network bus comprises a deterministic Ethernet fieldbus.

15. The system of claim 10, wherein the deterministic frame-based communication protocol comprises one of EtherCAT and PROFINET.

16. The system of claim 10, wherein the first transceiver comprises a small form-factor pluggable (SFP) transceiver.

17. A system for extending a deterministic network in a power delivery system over a wide area, comprising:
    a local deterministic network bus configured to transport power system data using a deterministic frame-based communication protocol;
    an intelligent electronic device (IED) configured to transmit power system data via the local deterministic network bus using the deterministic frame-based communication protocol;
    a remote deterministic network bus configured to transport power system data using the deterministic frame-based communication protocol;
    a first transceiver in communication with the local deterministic network bus, the first transceiver configured to:
    receive frames of power system data transmitted by the IED using the deterministic frame-based communication protocol;
    encapsulate the received frames of power system data; and
    transmit the encapsulated frames of power system data via a multiplexing synchronized optical network to the remote deterministic network bus; and a second transceiver in communication with the remote deterministic network bus configured to:
  receive encapsulated frames of power system data transmitted by the first transceiver via the multiplexing synchronized optical network;
  de-encapsulate the received encapsulated frames of power system data; and
  transmit the de-encapsulated frames of power system data via the remote deterministic network bus using the deterministic frame-based communication protocol; and
wherein a determinism of the frames of power system data is configured to be preserved between the local deterministic network bus and the remote deterministic network bus.

18. The system of claim 17, further comprising at least one local input/output (I/O) device configured to communicate power system data with the IED via the local deterministic network bus.

19. The system of claim 17, further comprising at least one remote input/output (I/O) device in communication with the remote deterministic bus configured to communicate power system data with the IED via the first transceiver and the second transceiver.

20. The system of claim 17, wherein the local deterministic network bus comprises a first deterministic Ethernet fieldbus and the remote deterministic network bus comprises a second deterministic Ethernet fieldbus.

21. The system of claim 17, wherein the deterministic frame-based communication protocol comprises one of EtherCAT and PROFINET.

22. The system of claim 17, wherein the first transceiver comprises a first small form-factor pluggable (SFP) transceiver and the second transceiver comprises a second small form-factor pluggable (SFP) transceiver.

* * * * *